(12) United States Patent
Song (10) Patent No.: US 11,775,212 B2
(45) Date of Patent: Oct. 3, 2023

(54) DATA STORAGE DEVICE AND OPERATING METHOD THEREOF

(71) Applicant: SK hynix Inc., Icheon-si (KR)

(72) Inventor: Da Eun Song, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 17/188,328

(22) Filed: Mar. 1, 2021

(65) Prior Publication Data

US 2022/0004340 A1 Jan. 6, 2022

(30) Foreign Application Priority Data

Jul. 6, 2020 (KR) .................. 10-2020-0082960

(51) Int. Cl.
*G06F 3/06* (2006.01)

(52) U.S. Cl.
CPC .......... *G06F 3/0659* (2013.01); *G06F 3/0611* (2013.01); *G06F 3/0635* (2013.01); *G06F 3/0652* (2013.01); *G06F 3/0683* (2013.01)

(58) Field of Classification Search
CPC .... G06F 3/0683; G06F 3/0652; G06F 3/0635; G06F 3/0611; G06F 3/0659
USPC ......................................................... 711/158
See application file for complete search history.

(56) References Cited

U.S. PATENT DOCUMENTS

| | | | |
|---|---|---|---|
| 2013/0080685 A1* | 3/2013 | Park | G06F 3/0641 |
| | | | 711/E12.078 |
| 2016/0179370 A1* | 6/2016 | Kumar | G06F 11/1076 |
| | | | 714/770 |
| 2017/0090791 A1* | 3/2017 | Grubisic | G06F 3/0689 |
| 2018/0032275 A1* | 2/2018 | Pahwa | G06F 3/0649 |
| 2020/0159419 A1* | 5/2020 | Li | G06F 3/068 |
| 2020/0349186 A1* | 11/2020 | Yang | G06F 3/0641 |
| 2021/0064535 A1* | 3/2021 | Han | G06F 11/3471 |

FOREIGN PATENT DOCUMENTS

| | | |
|---|---|---|
| KR | 10-1891428 B | 8/2018 |
| KR | 10-1898322 B | 9/2018 |

* cited by examiner

*Primary Examiner* — Charles Rones
*Assistant Examiner* — Han V Doan
(74) *Attorney, Agent, or Firm* — Perkins Coie LLP (57) ABSTRACT

A data storage device includes a first memory device storing first data; a second memory device including a first zone storing second data, a second zone storing third data, and a third zone storing fourth data; a storage; and a controller in communication with the first memory device, the second memory device, and the storage and configured to receive one or more requests from a host and control an input and output of data from and to the first memory device, the second memory device, and the storage in response to the one or more requests from the host. The controller is further configured to copy a portion of the first data read from the first memory device to the first zone, copy a portion of the second data read from the first zone to the second zone, copy a portion of the third data read from the second zone to the third zone, and store data read more than a set number of times among data stored in the first memory device and the second memory device in the third zone.

18 Claims, 9 Drawing Sheets

DATA STORAGE DEVICE AND OPERATING METHOD THEREOF

CROSS-REFERENCES TO RELATED APPLICATION

This patent document claims priority under 35 U.S.C. § 119(a) to Korean Patent Application Number 10-2020-0082960, filed on Jul. 6, 2020, in the Korean Intellectual Property Office, which is incorporated herein by reference in its entirety.

TECHNICAL FIELD

The technology and implementations disclosed in this patent document generally relate to a semiconductor integrated device including a data storage device and an operating method thereof.

BACKGROUND

Computing devices may read data from a memory or write data in the memory in response to a request of a host or may process a command using data stored in the memory.

Cache memories may be used to reduce the time that a computing device accesses information stored in a memory. The cache memories may be high-speed memories which store copies of instructions or data relatively frequently used or expected to be frequently used.

Multi-level caches may be configured to provide hierarchical access speed to further mitigate a time delay which may be caused due to a speed difference between a processor and a memory.

SUMMARY

In an embodiment of the disclosed technology, a data storage device is provided to include: a first memory device storing first data; a second memory device including a first zone storing second data, a second zone storing third data, and a third zone storing fourth data; a storage; and a controller in communication with the first memory device, the second memory device, and the storage and configured to receive one or more requests from a host and control an input and output of data from and to the first memory device, the second memory device, and the storage in response to the one or more requests from the host. The controller is further configured to copy a portion of the first data read from the first memory device to the first zone, copy a portion of the second data read from the first zone to the second zone, copy a portion of the third data read from the second zone to the third zone, and store data read more than a set number of times among data stored in the first memory device and the second memory device in the third zone.

In an embodiment of the disclosed technology, an operating method of a data storage device. The method performed by the data storage device and comprising: receiving one or more requests from a host to read data from one of a first memory device, a second memory device including a first zone, a second zone, and a third zone, or a storage; reading data from the first memory device, the second memory device, or the storage, based on the one or more requests; providing, to the host, the data read from the first memory device, the second memory device, or the storage in response to each request from the host; and storing frequently read data that has been read more than a set number of times in the third zone.

These and other features, aspects, and embodiments are described in more detail below.

BRIEF DESCRIPTION OF THE DRAWINGS

The above and other aspects, features and advantages of the subject matter of the present disclosure will be more clearly understood from the following detailed description taken in conjunction with the accompanying drawings.

DETAILED DESCRIPTION

Various embodiments of the disclosed technology are described in detail with reference to the accompanying drawings. The drawings are schematic illustrations of various embodiments (and intermediate structures). As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes.

Although a few embodiments of the disclosed technology are shown and described, it will be appreciated by those of ordinary skill in the art that changes can be further made.

As a host and a processing device are faster and storage capacity of a memory is increased, there has been a need for an efficient operation policy of a memory device configured to store data between the processor and the memory. Some implementations of the disclosed technology provide a data storage device that can control cashing spaces of the data storage device to increase data read speed and improve an operation efficiency of the data storage device.

Figure 1:
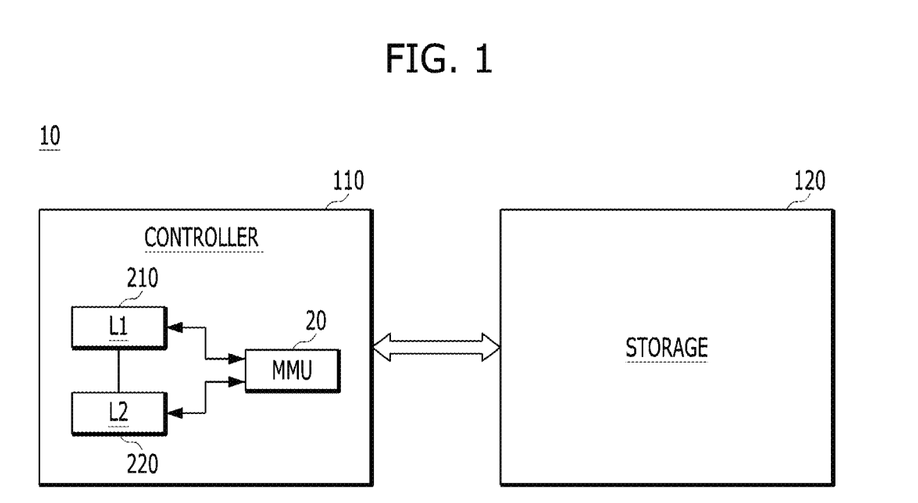
FIG. 1 is a diagram illustrating a configuration of a data storage device based on embodiments of the disclosed technology.

FIG. 1 is a diagram illustrating a configuration of a data storage device 10 based on an embodiment of the disclosed technology.

Referring to FIG. 1, the data storage device 10 according to an embodiment may include a controller 110 and a storage 120.

The controller 110 may control the storage 120 in response to a request of a host (not shown). In an embodiment, the controller 110 may control data to be programmed in the storage 120 in response to a write request from the host. The controller 110 may read data programmed in the storage 120 and provide the read data to the host in response to a read request from the host. In an embodiment, the controller 110 may perform an operation using data provided from the host or data stored in the storage 120 according to a request of the host and may provide output data derived as a result of the operation to the host or store the output data in the storage 120.

In an embodiment, the controller 110 may be implemented with a processer called a function block or a control logic configured to process accesses for data and instructions or may be implemented to include the processor.

The controller 110 may include a first memory device (L1) 210, a second memory device (L2) 220, and a memory manager (MMU) 20.

In an embodiment, the first memory device 210 may be a first level cache memory L1 which is logically and physically located closest to a processor of the controller 110 and operates at a first speed. In an embodiment, the first memory device 210 may include a volatile memory device or a nonvolatile memory device.

The second memory device 220 may be a second level cache memory L2 which operates at a second speed slower than the first speed. In an embodiment, the second memory device 220 may include a volatile memory device or a nonvolatile memory device. The second memory device 220 may be logically and physically located farther away from the processor of the controller 110 than the first memory device 210. In an embodiment, the second memory device 220 may be located between the first memory device 210 and the storage 120.

The storage 120 may be a disc device which operates at a third speed slower than the first speed. The third speed may be equal to the second speed or faster or slower than the second speed.

The storage 120 may store data or output stored data based on a control signal from the controller 110. The storage 120 may be configured as a volatile memory device and/or a nonvolatile memory device. In an embodiment, the nonvolatile memory device may be any one of various nonvolatile memory devices such as an electrically erasable and programmable read only memory (EEPROM), a NAND flash memory, a NOR flash memory, a phase-change random access memory (PRAM), a Resistive RAM (ReRAM), a ferroelectric RAM (FRAM), a spin torque transfer magnetic RAM (STT-MRAM), or others. In an embodiment, the volatile memory device may be any one of various volatile memory devices such as a dynamic random access memory (DRAM) or a static random access memory (SRAM).

The storage 120 may include a plurality of dies, a plurality of chips, or a plurality of packages. Further, the storage 120 may operate as a single-level cell (SLC) in which one-bit data is to be stored in one memory cell or a multi-level cell (MLC) in which multi-bit data is to be stored in one memory cell.

As described above, the first memory device 210, the second memory device 220, and the storage 120 may be configured to have a hierarchical structure in terms of distances from the processor and/or speed, and the memory manager 20 of the controller 110 may manage data to be stored in the first memory device 210, the second memory device 220, and the storage 120.

In an embodiment, the memory manager 20 may control the second memory device 220 by dividing the second memory device 220 into a plurality of zones. The first memory device 210 and the plurality of zones in the second memory device 220 may serve as independent caching spaces, and the memory manager 20 may retain or evict data stored in the caching spaces 210 and 220 based on a set criterion. To evict the data stored in the caching spaces 210 and 220, the memory manager 20 may collect hit information including time information that the data are hit, but this is not limited thereto.

In an embodiment, the memory manager 20 may control such that data which has been hit more than a certain number of times in the caching spaces 210 and 220 to be retained in a specific region of the second memory device 220, for example, an eviction suppression region and may suppress eviction of data in the eviction suppression region to the storage 120. As a result, data having high read frequency, for example, data that is highly likely to be accessed again in the future, may be read from not the storage 120 but the second memory device 220. By storing such data in the separate region such as the eviction suppression region in the second memory device 220 instead of the storage 120, it is possible to read data at a higher speed.

Accordingly, the access frequency of the controller 110 to the storage 120 for accessing data required to process a request of the host can be reduced, and thus operation speed of the data storage device 10 can be improved.

Figure 2:
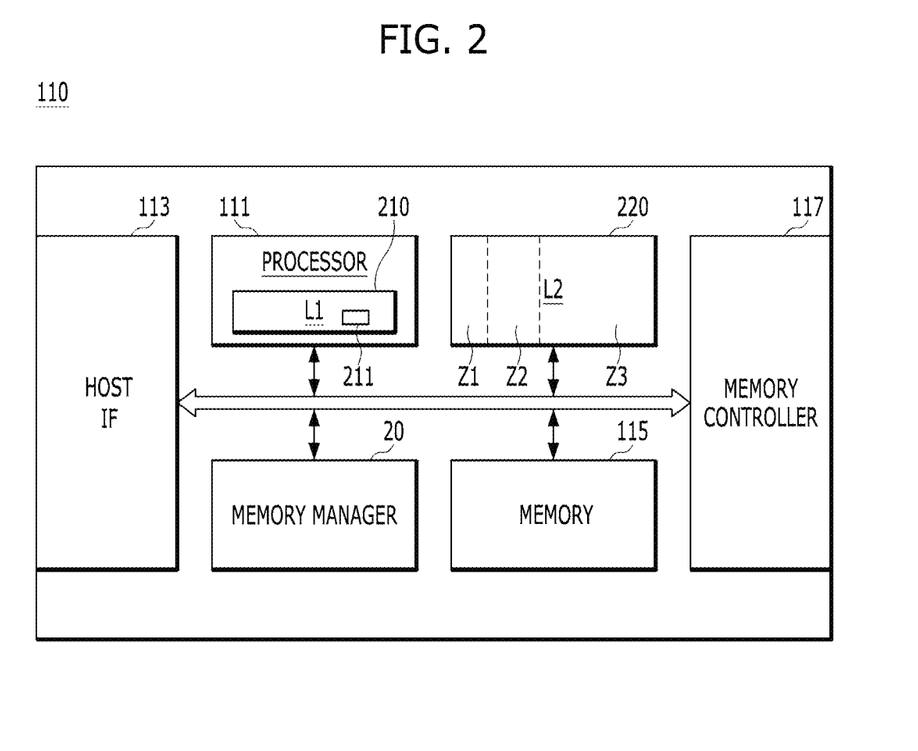
FIG. 2 is a diagram illustrating a configuration of a controller based on an embodiment of the disclosed technology.

FIG. 2 is a diagram illustrating a configuration of the controller 110 according to an embodiment.

Referring to FIG. 2, the controller 110 according to an embodiment may include a processor 111, a host interface 113, a memory 115, a memory controller 117, the second memory device 220, and the memory manager 20.

The processor 111 may include the first memory device 210. The first memory device 210 may be provided as a portion of the caching space and configured to store instructions and data used to perform an operation in response to a request from a host. In FIG. 2, as an example, the first memory device 210 is provided inside of the processor 111, but other implementations are also possible. For example, the first memory device 210 may be provided outside of the processor 111.

In an embodiment, the first memory device 210 may include a memory circuit such as a SRAM or a DRAM and control circuits configured to process accesses to data stored in the memory circuit. The first memory device 210 may be logically and physically located relatively close to the processor 111 and operate at a first speed.

The second memory device 220 may be a second level cache memory L2 which operates at a second speed slower than the first speed and is logically and physically located farther away from the processor 111 than the first memory device 210. The second memory device 220 may be divided into a first zone Z1, a second zone Z2, and a third zone Z3.

A unique identifier (ID) may be allocated to each of the caching spaces, i.e., the first memory device 210 and the zones Z1, Z2, and Z3 of the second memory device 220.

The host interface 113 may receive a command and a clock signal from the host according to control of the processor 111 and provide a communication channel for controlling data input/output. In particular, the host interface 113 may provide a physical connection between the host and the data storage device 10. The host interface 113 may provide interfacing between the data storage device 10 and the host according to a bus format of the host. The bus format of the host may include at least one among standard interface protocols such as a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI-express (PCI-E) protocol, or a universal flash storage (UFS) protocol.

Program codes, for example, firmware or software required for an operation of the controller 110 may be stored in the memory 115. The memory 115 may include a read only memory (ROM) configured to store code data and the like used by the program codes and a RAM configured to store data required for an operation of the controller 110 or data generated by the controller 110.

The memory controller 117 may provide a communication channel for signal transmission and reception between the controller 110 and the storage 120. The memory controller 117 may write input data of the host in the storage 120 according to control of the processor 111. The memory controller 117 may provide data read out from the storage 120 to the host.

The memory manager 20 may process a memory access request from the processor 111. The processor 111 may transmit the memory access request for data or instructions to the memory manager 20. In order to process the memory access request from the processor 111, the memory manager 20 may transmit the corresponding memory access request to at least one among the first memory device 210, the second memory device 220, the memory 115, and the memory controller 117.

In an embodiment, for data are cached in the first memory device 210 or the second memory device 220, the caching positions of the data may be managed using the index table running in an application executed in the processor 111. In an embodiment, the index table may include mapping information between physical addresses and logical addresses of the data. The physical address may include IDs of the data caching spaces 210, Z1, Z2, and Z3 and storage positions of the data in the caching spaces 210, Z1, Z2, and Z3 having the corresponding IDs. Accordingly, when an access to specific data is necessary, the memory manager 20 may acquire a physical address of target data to be accessed from the index table and access the corresponding physical region to read the data.

Logical addresses of data stored in the third zone Z3 of the second memory device 220 may be managed in the first memory device 210 as a reference table 211. As data is stored in the third zone Z3, the reference table 211 may be used to indicate whether or not the data is present in the third zone Z3. In an embodiment, the reference table 211 may be configured by hashing the logical addresses of data to be stored in the third zone Z3, but this is not limited thereto.

When data for which a request for read operation is received from the host is not hit in the first memory device 210, the memory manager 20 may determine whether or not the data is present in the third zone Z3 by referring to the reference table 211. Such determination can be made prior to checking the first and second zone Z1 and Z2. When it is determined that the data is present in the third zone Z3, the memory manager 20 may read the data from a corresponding physical region of the third zone Z3 by referring to the index table and provide the read data to the host. When it is determined that the corresponding data is not present in the third zone Z3, the memory manager 20 may search for the data by sequentially accessing the first zone Z1 and the second zone Z2 based on the index table.

In an embodiment, the memory manager 20 may copy data that is hit in the first memory device 210 to the first zone Z1, copy data hit in the first zone Z1 to the second zone Z2, and copy data that is hit in the second zone Z2 to the third zone Z3. As a result, data frequently hit in the cache levels 210 and 220 can be accumulated in the third zone Z3 of the second memory device 220.

The memory manager 20 may suppress eviction of the data accumulated in the third zone Z3 to the storage 120. Thus, the third zone Z3 may be referred to as an eviction suppression region.

As a result, the data having high read frequency may be read from the second memory device 220 without accessing the storage 120, and thus the read performance of the data storage device 10 can be improved. Further, the access to the storage 120 having limited lifespan can be minimized, and thus the lifespan of the data storage device 10 can be increased.

Figure 3:
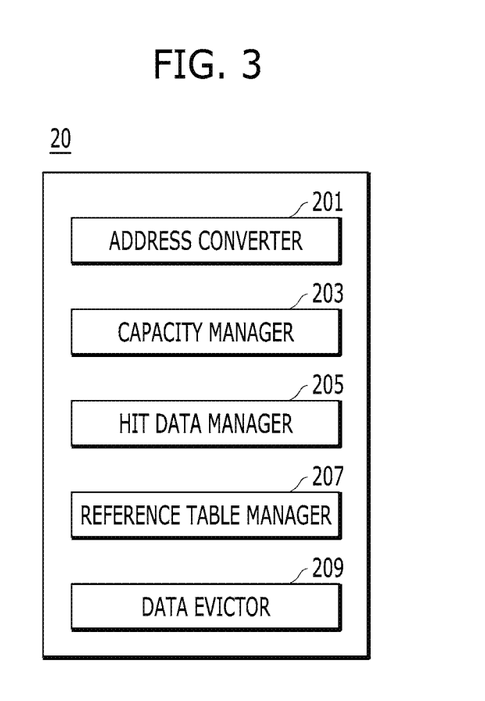
FIG. 3 is a diagram illustrating a configuration of a memory manager based on an embodiment of the disclosed technology.

FIG. 3 is a diagram illustrating a configuration of the memory manager 20 according to an embodiment.

Referring to FIG. 3, the memory manager 20 may include an address converter 201, a capacity manager 203, a hit data manager 205, a reference table manager 207, and a data evictor 209.

The address converter 201 may perform an operation for converting a virtual address used for processing of an application by the processor 111 into a physical address in which data is located. In an embodiment, to convert the virtual address into the physical address, the address converter 201 may use a page table or a translation lookaside buffer (TLB) configured to store at least one entry selected among entries of the page table. The page table may include a plurality of entries and each of the plurality of entries may include a virtual address, a physical page address corresponding to the virtual address, and meta information. The TLB may allow the memory request of the processor 111 to be processed at high speed by storing at least one entry selected among the entries of the page table according to a set criterion.

As the data are cached into the caching space 210 and 220, the caching positions of the data may be managed as the index table in an application executed in the processor 111 and the address converter 201 may detect the caching position of read target data by referring to the index table. The index table may be a table that a physical address of the data and the ID of the cached memory device or the cached zone are mapped to each other In an embodiment, capacity of each of the first zone Z1, the second zone Z2, and the third zone Z3 in the second memory device 220 may be defined by the user or may be set by the processor 111 or an application executed in the processor 111.

As data are stored in the first zone Z1, the capacity manager 203 may compare a data occupancy rate of the first zone Z1 with a first threshold value TH1. As data are stored in the second zone Z2, the capacity manager 203 may compare a data occupancy rate of the second zone Z2 with a second threshold value TH2. As data are stored in the third zone Z3, the capacity manager 203 may compare a data occupancy rate of the third zone Z3 with a third threshold value TH3.

The hit data manager 205 may copy data hit in the first memory device 210 to the first zone Z1, copy data hit in the first zone Z1 to the second zone Z2, and copy data hit in the second zone Z2 to the third zone Z3. Accordingly, the data stored in the third zone Z3 may be a set of data frequently hit in the cache levels 210 and 220.

As the data are stored in the third zone Z3 through the heat data manager 205, the reference table manager 207 may establish whether corresponding data is present in the third zone Z3 as the reference table 211. In an embodiment, the reference table 211 may be configured by hashing logical addresses of the data stored in the third zone Z3, but this is not limited thereto.

The data evictor 209 may retain or evict the data of the first to third zones Z1, Z2, and Z3 based on the comparison results of the capacity manager 203. In an embodiment, when the data occupancy rate of the first zone Z1 is equal to or larger than the first threshold value TH1, the data evictor 209 may select and evict data from the first zone Z1 or release allocation of a selected data storage region so that the data occupancy rate of the first zone Z1 is equal to or less than a first reference value. When the data occupancy rate of the second zone Z2 is equal to or larger than the second threshold value TH2, the data evictor 209 may select and evict data from the second zone Z2 or release allocation of a selected data storage region so that the data occupancy rate of the second zone Z2 is equal to or less than a second reference value.

When the data occupancy rate of the third zone Z3 is equal to or larger than the third threshold value TH3, the data evictor 209 may select and evict data from the third zone Z3 or release allocation of a selected data storage region so that the data occupancy rate of the third zone Z3 is less than a third reference value. The first to the third reference value may be defined by the user or may be set by the processor 111 or an application executed in the processor 111. The data evicted from the third zone Z3 may be stored in the storage 120.

The data evictor 209 may select eviction target data randomly or using a Least-Recently Used (LRU) policy or various policies similar to or different from the LRU policy.

Figure 4:
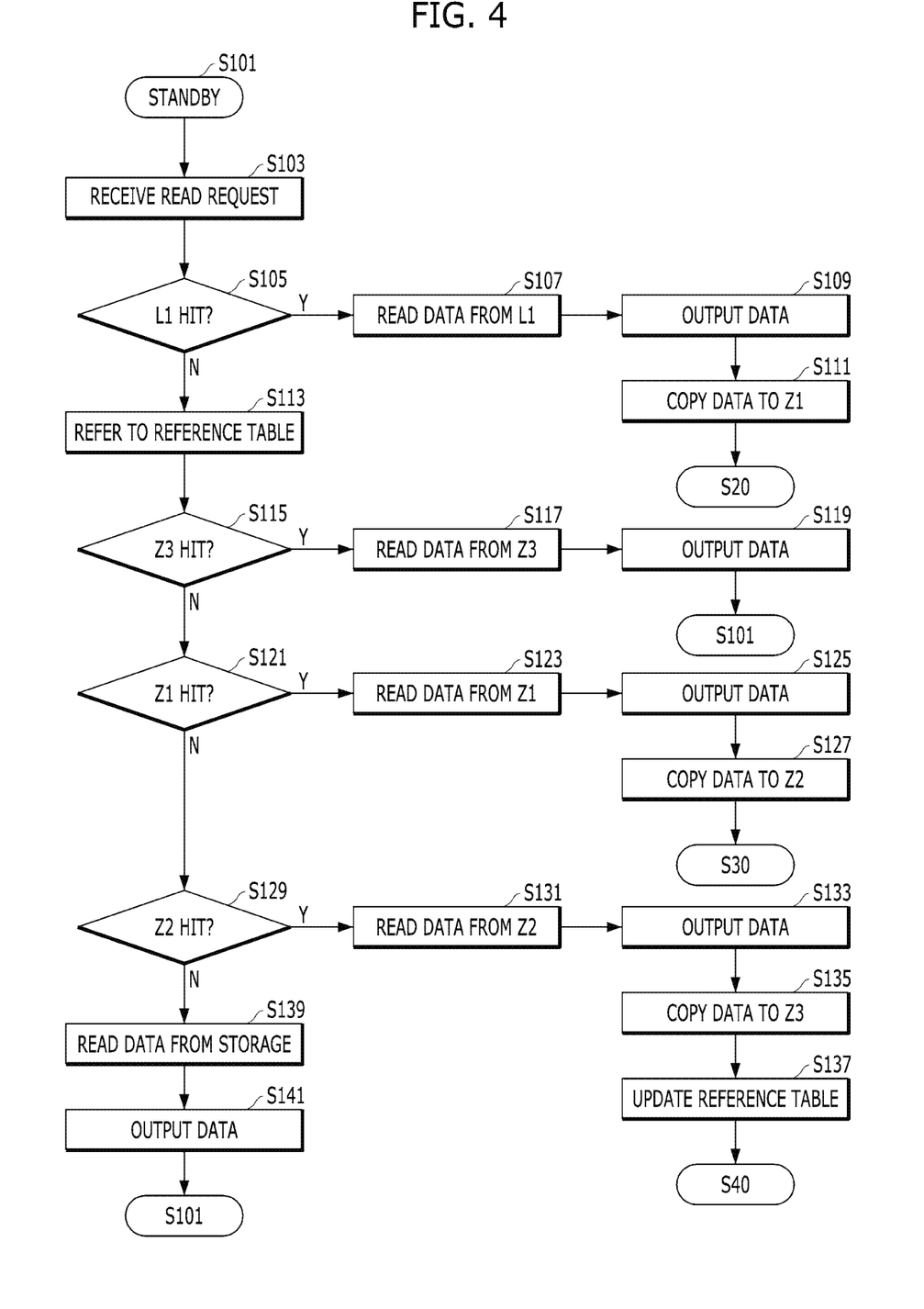
FIG. 4 is a flowchart explaining an operating method of a data storage device based on an embodiment of the disclosed technology.

FIG. 4 is a flowchart illustrating an operating method of a data storage device based on an embodiment of the disclosed technology. FIG. 4 illustrates the operating method when the data storage device receives a request from the host to perform a read operation and performs the read operation.

Referring to FIG. 4, as the controller 110 in a standby state (S101) executes an application in response to a request of a host, the controller 110 may receive a read command (S103). The controller 110 may extract a physical page address corresponding to a read-requested virtual address through the address converter 201 of the memory manager 20 in response to the received command.

The controller 110 may determine whether or not data located in the extracted physical page address is present in the first memory device (L1) 210 (S105) and when it is determined that the data is present in the first memory device 210 (S105:Y), the controller 110 may read the data from the first memory device (L1) 210 (S107) and output the read data (S109). Further, the controller 110 may copy the read data to the first zone Z1 (S111). The copying of the read data to the first zone Z1 may be followed by a capacity management operation (S20) for the first zone Z1.

When it is determined that the data located in the extracted physical page address is not present in the first memory device (L1) 210 (S105:N), the controller 110 may determine whether or not the access target data is present in the third zone Z3 (S115) by referring to the reference table 211 in the first memory device 210 (S113).

When it is determined that the access target data is present in the third zone Z3 (S115:Y), the controller 110 may read the data from the third zone Z3 (S117) and output the read data (S119). Then, the controller 110 may be in a standby state (S101).

When it is determined that the access target data is not present in the third zone Z3 (S115:N), the controller 110 may determine whether or not the access target data is present in the first zone Z1 based on the index table managed in the executing application (S121). When it is determined that the access target data is present in the first zone Z1 (S121:Y), the controller 110 may read the data from the first zone Z1 (S123) and output the read data (S125). Further, the controller 110 may copy the read data to the second zone Z2 (S127). The copying of the read data to the second zone Z2 may be followed by a capacity management operation (S30) for the second zone Z2.

When it is determined that the access target data is not present in the first zone Z1 (S121:N), the controller 110 may determine whether or not the access target data is present in the second zone Z2 based on the index table (S129). When it is determined that the access target data is present in the second zone Z2 (S129:Y), the controller 110 may read the data from the second zone Z2 (S131) and output the read data (S133). Further, the controller 110 may copy the read data to the third zone Z3 (S135). The reference table 211 may be updated according to a logical address of the data copied to the third zone Z3 (S137). The copying of the read data to the third zone Z3 may be followed by a capacity management operation (S40) for the third zone Z3.

When it is determined that the access target data is not present in the second zone Z2 (S129:N), the controller 110 may access the storage 120, read the data from the storage 120 (S139), and output the read data (S141). Then, controller 110 may be in a standby state (S101).

Figure 5:
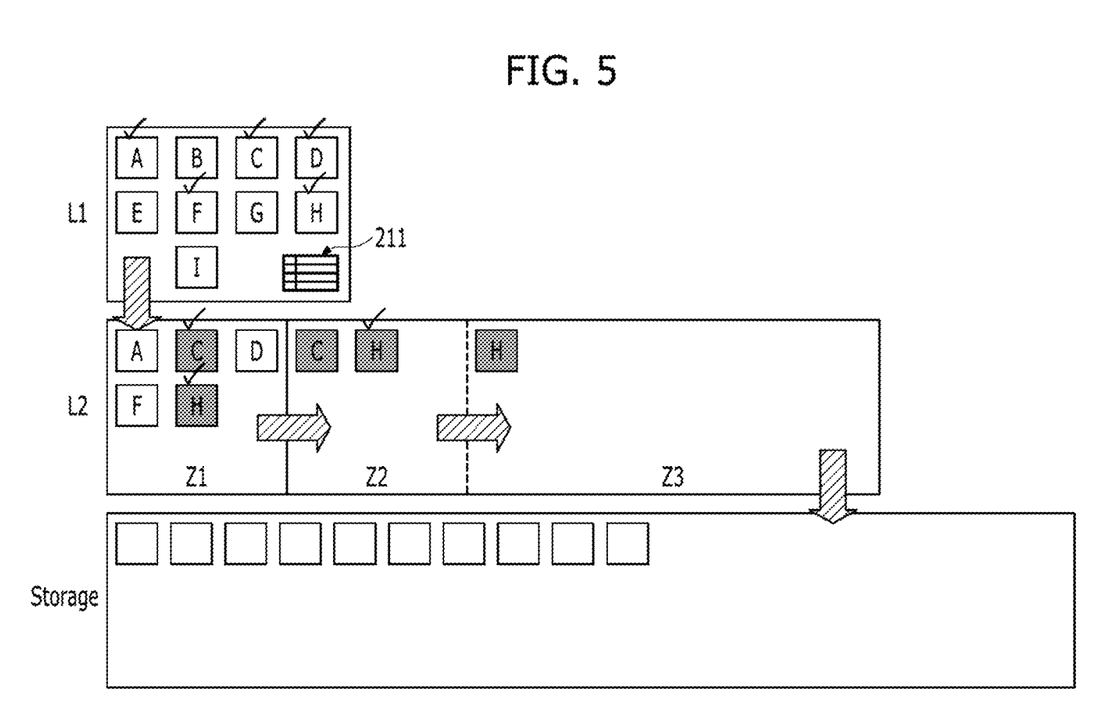
FIG. 5 is a simplified diagram explaining an operating method of a data storage device based on an embodiment of the disclosed technology.

FIG. 5 is a diagram explaining an operating method of a data storage device based on an embodiment of the disclosed technology.

Data A, C, D, F, and H that is hit in the first memory device (L1) 210 may be copied to the first zone Z1 of the second memory device (L2) 220.

The data C and H that is hit in the first zone Z1 may be copied to the second zone Z2.

The data H that is hit in the second zone Z2 may be copied to the third zone Z3 and the reference table 211 may be updated by hashing a logical address of the data H.

When the data occupancy rate of the third zone Z3 is equal to or larger than the third threshold value TH3, victim data is selected from the third zone Z3 and then evicted to the storage 120 so that the data occupancy rate of the third zone Z3 is less than the third reference value.

Figure 6:
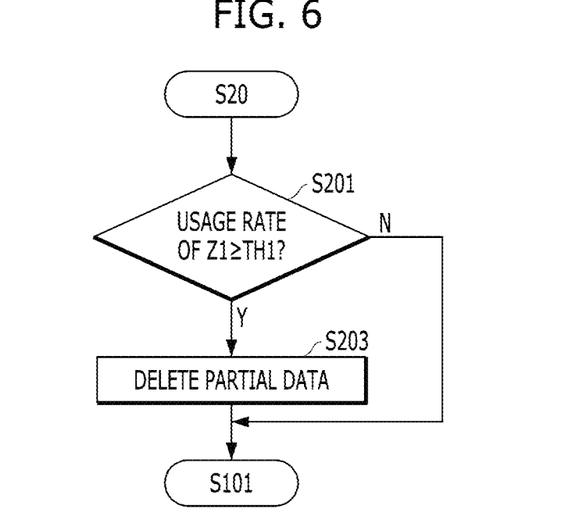
FIGS. 6 to 8 are flowcharts explaining methods of managing capacity of a data storage device based on an embodiment of the disclosed technology.
Figure 7:
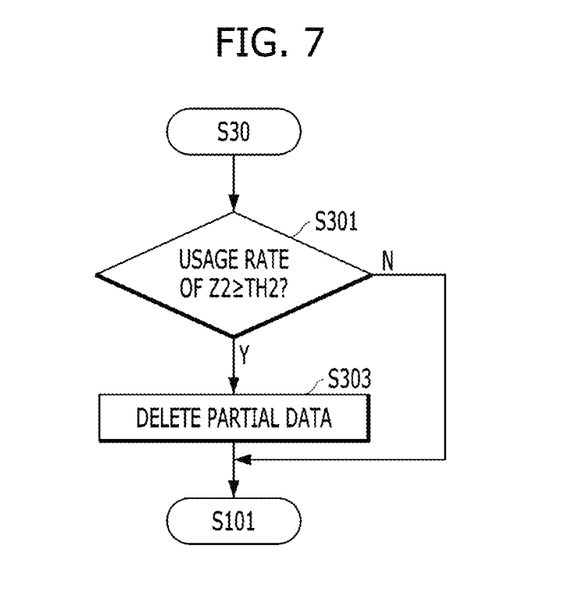
Figure 8:
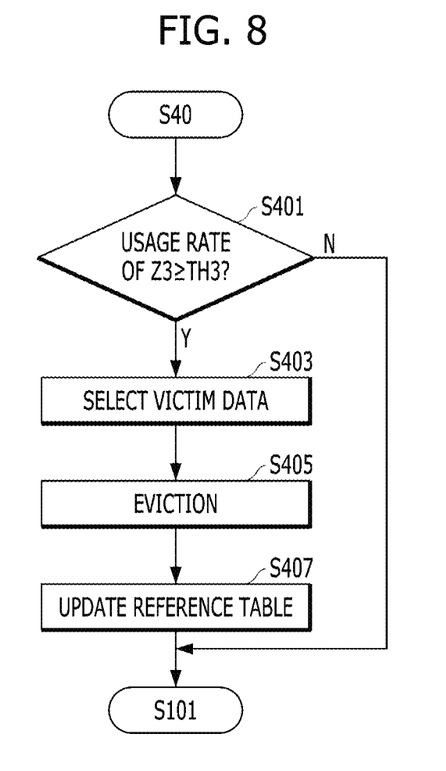

FIGS. 6 to 8 are flowcharts explaining methods of managing capacity of a data storage device according to an embodiment.

FIG. 6 illustrates an example of the capacity management operation (S20) for the first zone Z1.

As the data hit in the first memory device 210 is copied to the first zone Z1, the controller 110 may determine whether or not the data occupancy rate of the first zone Z1, for example, the usage rate of the first zone Z1 is equal to or larger than the first threshold value TH1 (S201). When it is determined that the data, which are equal to or larger than the first threshold value TH1, are stored in the first zone Z1 (S201:Y), the controller 110 may select and delete victim data from the first zone Z1 so that the usage rate of the first zone Z1 is equal to or less than the first reference value (S203).

When it is determined that the data occupancy rate of the first zone Z1 is less than the first threshold value TH1 (S201:N) or after the victim data is deleted from the first zone Z1, the controller 110 may be transited to the standby state (S101).

FIG. 7 illustrates an example of the capacity management operation (S30) for the second zone Z2.

As the data hit in the first zone Z1 is copied to the second zone Z2, the controller 110 may determine whether or not the data occupancy rate of the second zone Z2, for example, the usage rate of the second zone Z2 is equal to or larger than the second threshold value TH2 (S301). When it is determined that the data, which are equal to or larger than the second threshold value TH2, are stored in the second zone Z2 (S301:Y), the controller 110 may select and delete victim data from the second zone Z2 so that the usage rate of the second zone Z2 is equal to or less than the second reference value (S303).

When it is determined that the data occupancy rate of the second zone Z2 is less than the second threshold value TH2 (S301:N) or after the victim data is deleted from the second zone Z2, the controller 110 may be transited to the standby state (S101).

FIG. 8 illustrates an example of the capacity management operation (S40) for the third zone Z3.

Referring to FIG. 8, as the data hit in the second zone Z2 is copied to the third zone Z3, the controller 110 may determine whether or not the data occupancy rate of the third zone Z3, for example, the usage rate of the third zone Z3 is equal to or larger than the third threshold value TH3 (S401). When it is determined that the data, which are equal to or larger than the third threshold value TH3, are stored in the third zone Z3 (S401:Y), the controller 110 may select victim data from the third zone Z3 (S403) and evict the selected victim data to the storage 120 (S405) so that the usage rate of the third zone Z3 is less than the third reference value. As the data is evicted from the third zone Z3, the reference table 211 may be updated (S407).

The victim data to be deleted or evicted from each of the zones Z1 to Z3 in FIGS. 6 to 8 may be randomly selected or may be selected through a Least-Recently Used (LRU) policy or various policies similar to or different from the LRU policy.

As the data repeatedly accessed in the cache levels are retained in the eviction suppression region, the access to the storage can be minimized, and thus the performance and lifespan of the data storage device can be improved.

Figure 9:
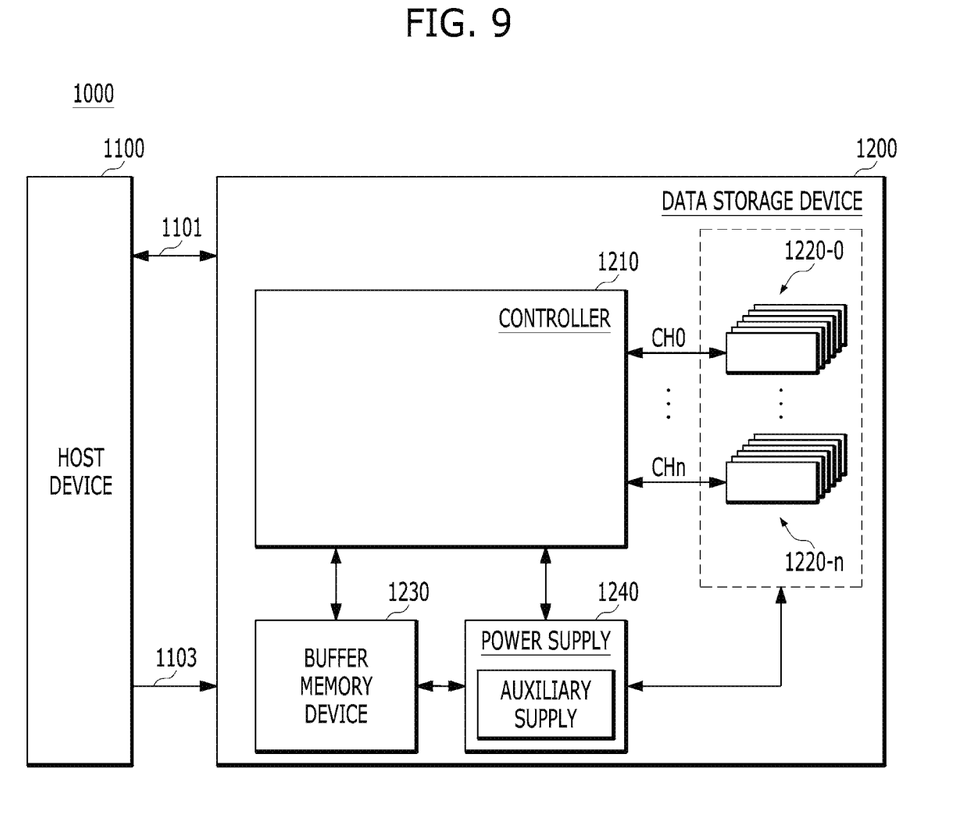
FIG. 9 is a diagram illustrating a data storage system based on an embodiment of the disclosed technology.

FIG. 9 is a diagram illustrating a data storage system 1000, based on an embodiment f the disclosed technology.

Referring to FIG. 9, the data storage 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to 1220-$n$, a buffer memory device 1230, a power supply 1240, a signal connector 1101, and a power connector 1103.

The controller 1210 may control general operations of the data storage device 1200. The controller 1210 may include a host interface unit, a control unit, a random access memory used as a working memory, an error correction code (ECC) unit, and a memory interface unit. In an embodiment, the controller 1210 may configured as controller 110 shown in FIGS. 1 and 2.

The host device 1100 may exchange a signal with the data storage device 1200 through the signal connector 1101. The signal may include a command, an address, data, and so forth.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-$n$. Further, the buffer memory device 1230 may temporarily store the data read from at least one of the nonvolatile memory devices 1220-0 to 1220-$n$. The data temporarily stored in the buffer memory device 1230 may be transmitted to the host device 1100 or at least one of the nonvolatile memory devices 1220-0 to 1220-$n$ according to control of the controller 1210.

The nonvolatile memory devices 1220-0 to 1220-$n$ may be used as storage media of the data storage device 1200. The nonvolatile memory devices 1220-0 to 1220-$n$ may be coupled with the controller 1210 through a plurality of channels CH0 to CH$n$, respectively. One or more nonvolatile memory devices may be coupled to one channel. The nonvolatile memory devices coupled to each channel may be coupled to the same signal bus and data bus.

The power supply 1240 may provide power inputted through the power connector 1103 to the controller 1210, the nonvolatile memory devices 1220-0 to 1220-$n$ and the buffer memory device 1230 of the data storage device 1200. The power supply 1240 may include an auxiliary power supply. The auxiliary power supply may supply power to allow the data storage device 1200 to be normally terminated when a sudden power interruption occurs. The auxiliary power supply may include bulk-capacity capacitors sufficient to store the needed charge.

The signal connector 1101 may be configured as one or more of various types of connectors depending on an interface scheme between the host device 1100 and the data storage device 1200.

The power connector 1103 may be configured as one or more of various types of connectors depending on a power supply scheme of the host device 1100.

Figure 10:
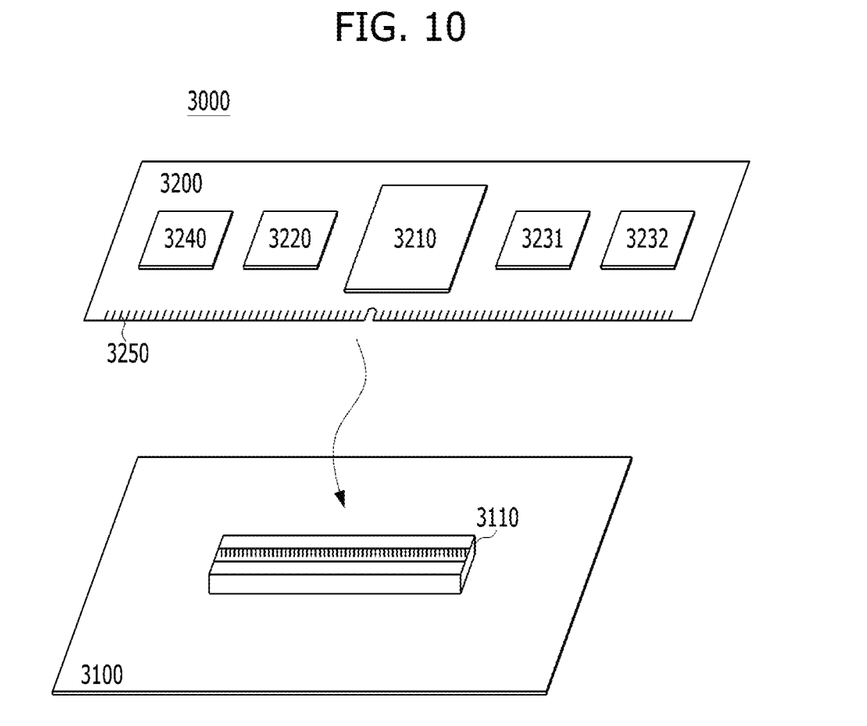
FIG. 10 and FIG. 11 are diagrams illustrating a data processing system based on an embodiment of the disclosed technology.

FIG. 10 is a diagram illustrating a data processing system 3000 based on an embodiment of the disclosed technology. Referring to FIG. 10, the data processing system 3000 may include a host device 3100 and a memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 110 shown in FIGS. 1 and 2.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as data storage medium of the memory system 3200.

The PMIC 3240 may provide the power inputted through the connection terminal 3250 to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and so forth, and power may be transferred between the host device 3100 and the memory system 3200. The connection terminal 3250 may be configured as one or more of various types depending on an interface scheme between the host device 3100 and the memory system 3200. The connection terminal 3250 may be disposed on a side of the memory system 3200, as shown.

Figure 11:
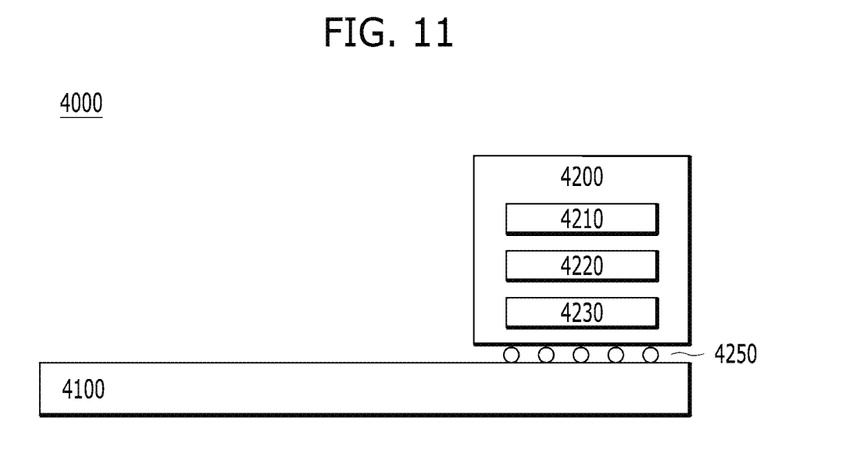

FIG. 11 is a diagram illustrating a data processing system 4000 based on an embodiment of the disclosed technology. Referring to FIG. 11, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 shown in FIGS. 1 and 2.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 12:
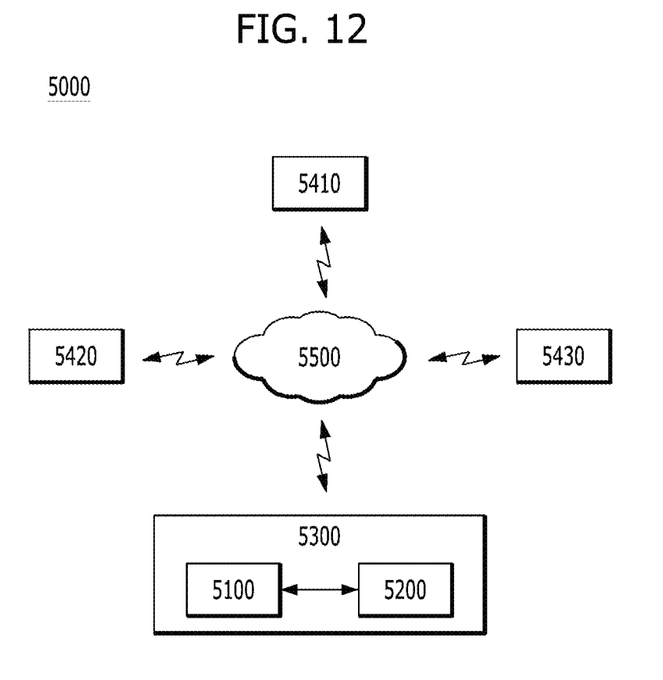
FIG. 12 is a diagram illustrating a network system including a data storage device based on an embodiment of the disclosed technology.

FIG. 12 is a diagram illustrating a network system 5000 including a data storage device based on an embodiment of the disclosed technology. Referring to FIG. 12, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may be configured as the memory system 10 shown in FIG. 1, the data storage device 1200 shown in FIG. 9, the memory system 3200 shown in FIG. 10, or the memory system 4200 shown in FIG. 11.

Only limited examples of implementations or embodiments of the disclosed technology are described or illustrated. Variations and enhancements for the disclosed implementations or embodiments and other implementations or embodiments are possible based on what is disclosed and illustrated in this patent document.

What is claimed is:

1. A data storage device comprising:
a first memory device storing first data;
a second memory device including a first zone storing second data, a second zone storing third data, and a third zone storing fourth data;
a storage; and
a controller in communication with the first memory device, the second memory device, and the storage and configured to receive one or more requests from a host and control an input and output of data from and to the first memory device, the second memory device, and the storage in response to the one or more requests from the host,
wherein the controller is further configured to read a portion of the first data, a portion of the second data, and a portion of the third data,
wherein the controller is further configured to copy the portion of the first data to the first zone of the second memory device as the second data, copy the portion of the second data to the second zone as the third data, and to copy the portion of the third data to the third zone as the fourth data, and
wherein an eviction policy is applied to the third zone to evict certain data from the third zone to the storage and wherein the eviction policy applied to the third zone is different from those applied to the first zone and the second zone.

2. The data storage device of claim 1, wherein the first memory device, the second memory device, and the storage are configured to operate at a first speed, a second speed slower than the first speed, and a third speed slower than the first speed, respectively.

3. The data storage device of claim 1, wherein the controller is configured to manage addresses of the fourth data stored in the third zone using a reference table.

4. The data storage device of claim 3, wherein the controller is configured to determine whether or not to access the third zone by referring to the reference table when read data requested by the host is not present in the first memory device.

5. The data storage device of claim 1, wherein the controller is configured to retain the fourth data of the third zone until a data occupancy rate of the third zone reaches a first setting value.

6. The data storage device of claim 5, wherein the controller is configured to select victim data from the third zone and evict the selected victim data to the storage when the data occupancy rate of the third zone reaches the first setting value.

7. The data storage device of claim 6, wherein the controller is configured to select the victim data so that the data occupancy rate of the third zone is less than a second setting value.

8. The data storage device of claim 1, wherein the controller is configured to select victim data among the second data and delete the selected victim data from the first zone based on data occupancy rates of the first zone.

9. The data storage device of claim 1, wherein the controller is configured to select victim data among the third data and delete the selected victim data from the second zone based on data occupancy rates of the second zone.

10. An operating method of a data storage device, the method performed by the data storage device and comprising:
receiving one or more requests from a host to read data from one of a first memory device, a second memory device including a first zone, a second zone, and a third zone, or a storage;
reading data from the first memory device, the second memory device, or the storage, based on the one or more requests;
providing, to the host, the data read from the first memory device, the second memory device, or the storage in response to each request from the host;
copying a portion of first data read from the first memory device to the first zone as a second data;
copying a portion of the second data read from the first zone to the second zone as a third data; and
copying a portion of the third data read from the second zone to the third zone as a fourth data;
wherein an eviction policy is applied to the third zone to evict certain data from the third zone to the storage and wherein the eviction policy applied to the third zone is different from those applied to the first zone and the second zone.

11. The method of claim 10, wherein the first memory device, the second memory device, and the storage are configured to operate at a first speed, a second speed slower than the first speed, and a third speed slower than the first speed, respectively.

12. The method of claim 10, further comprising configuring a reference table including addresses of data that is stored in the third zone.

13. The method of claim 12, wherein the reading data includes: checking whether the data corresponding to a request from the host requested from the host; and determining whether or not to access the third zone by referring to the reference table when a result of the checking indicates that the data is not present in the first memory device.

14. The method of claim 12, further comprising: retaining data stored in the third zone until a data occupancy rate of the third zone reaches a first setting value.

15. The method of claim 14, further comprising selecting victim data from the third zone and evicting the victim data to the storage when the data occupancy rate of the third zone reaches the first setting value.

16. The method of claim 15, further comprising select the victim data from the third zone so that the data occupancy rate of the third zone is less than a second setting value.

17. The method of claim 10, further comprising selecting victim data in the first zone and deleting the selected victim data from the first zone based on data occupancy rates of the first zone.

18. The method of claim 10, further comprising: selecting victim data in the second zone and deleting the selected victim data from the second zone based on data occupancy rates of the second zone.

* * * * *